US010648818B2

(12) United States Patent
Denaro

(10) Patent No.: US 10,648,818 B2
(45) Date of Patent: *May 12, 2020

(54) DATA MINING IN A DIGITAL MAP DATABASE TO IDENTIFY BLIND INTERSECTIONS ALONG ROADS AND ENABLING PRECAUTIONARY ACTIONS IN A VEHICLE

(71) Applicant: HERE Global B.V., Eindhoven (NL)

(72) Inventor: Robert Denaro, Long Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,601

(22) Filed: Sep. 18, 2017

(65) Prior Publication Data

US 2018/0038698 A1    Feb. 8, 2018

Related U.S. Application Data

(63) Continuation of application No. 15/041,672, filed on Feb. 11, 2016, now Pat. No. 9,797,735, which is a
(Continued)

(51) Int. Cl.
*G01C 21/26* (2006.01)
*G06F 16/29* (2019.01)
(Continued)

(52) U.S. Cl.
CPC ............. *G01C 21/26* (2013.01); *G01C 21/20* (2013.01); *G01C 21/3697* (2013.01);
(Continued)

(58) Field of Classification Search
CPC combination set(s) only.
See application file for complete search history.

(56) References Cited

U.S. PATENT DOCUMENTS 4,775,865 A    10/1988  Smith et al.
5,280,632 A    1/1994   Jung-Gon
(Continued)

FOREIGN PATENT DOCUMENTS

DE    10030819    1/2002
EP    1069547     1/2001

OTHER PUBLICATIONS

European Office Action dated Mar. 8, 2018, European Office Action cited in the corresponding European Application No. 09 251 231.8; dated Mar. 8, 2018; 6 pages.

*Primary Examiner* — Adam D Tissot
*Assistant Examiner* — Edward J Pipala
(74) *Attorney, Agent, or Firm* — Lempia Summerfield Katz LLC

(57) ABSTRACT

Disclosed is a feature for a vehicle that enables taking precautionary actions in response to conditions on the road network around or ahead of the vehicle, in particular, a blind intersection along a section of road. A database that represents the road network is used to determine locations where a blind intersection is located along a section of road. Then, precautionary action data is added to the database to indicate a location at which a precautionary action is to be taken about the blind intersection located along the section of road. A precautionary action system installed in a vehicle uses this database, or a database derived therefrom, in combination with a positioning system to determine when the vehicle is at a location that corresponds to the location of a precautionary action. When the vehicle is at such a location, a precautionary action is taken by a vehicle system as the vehicle is approaching a blind intersection.

48 Claims, 5 Drawing Sheets

Related U.S. Application Data continuation of application No. 14/694,252, filed on Apr. 23, 2015, now Pat. No. 9,279,688, which is a continuation of application No. 14/182,825, filed on Feb. 18, 2014, now Pat. No. 9,043,127, which is a continuation of application No. 12/156,276, filed on May 30, 2008, now Pat. No. 8,688,369.

(51) Int. Cl.
| | | |
|---|---|---|
| *G06F 16/21* | (2019.01) | |
| *G06F 16/9537* | (2019.01) | |
| *G01C 21/36* | (2006.01) | |
| *G09B 29/00* | (2006.01) | |
| *G01C 21/20* | (2006.01) | |

(52) U.S. Cl.
CPC ............ *G06F 16/219* (2019.01); *G06F 16/29* (2019.01); *G06F 16/9537* (2019.01); *G09B 29/007* (2013.01)

(56) References Cited

U.S. PATENT DOCUMENTS

| | | |
|---|---|---|
| 5,315,295 A | 5/1994 | Fujii |
| 5,617,086 A | 4/1997 | Klashinsky et al. |
| 5,635,920 A | 6/1997 | Pogue et al. |
| 5,642,093 A | 6/1997 | Kinoshita et al. |
| 5,757,949 A | 5/1998 | Kinoshita et al. |
| 5,904,728 A | 5/1999 | Tamai et al. |
| 5,944,768 A | 8/1999 | Ito et al. |
| 5,978,724 A | 11/1999 | Sekine |
| 5,978,731 A | 11/1999 | Matsuda |
| 5,983,389 A | 11/1999 | Shimizu |
| 6,008,741 A | 12/1999 | Shinagawa et al. |
| 6,064,941 A | 5/2000 | Nimura et al. |
| 6,067,497 A | 5/2000 | Sekine et al. |
| 6,084,510 A | 7/2000 | Lemelson et al. |
| 6,088,659 A | 7/2000 | Kelley et al. |
| 6,092,005 A | 7/2000 | Okada |
| 6,092,014 A | 7/2000 | Okada |
| 6,141,619 A | 10/2000 | Sekine |
| 6,157,891 A | 12/2000 | Lin |
| 6,161,071 A | 12/2000 | Shuman et al. |
| 6,188,316 B1 | 2/2001 | Matsuno et al. |
| 6,199,011 B1 | 3/2001 | Matsuda |
| 6,204,778 B1 | 3/2001 | Bergan et al. |
| 6,208,927 B1 | 3/2001 | Mine et al. |
| 6,223,125 B1 | 4/2001 | Hall |
| 6,226,389 B1 | 5/2001 | Lemelson |
| 6,298,296 B1 | 10/2001 | Takahashi |
| 6,343,253 B1 | 1/2002 | Matsuura et al. |
| 6,353,785 B1 | 3/2002 | Shuman et al. |
| 6,356,839 B1 | 3/2002 | Monde et al. |
| 6,381,536 B1 | 4/2002 | Satoh et al. |
| 6,389,332 B1 | 5/2002 | Hess et al. |
| 6,401,023 B1 | 6/2002 | Takahashi |
| 6,405,128 B1 | 6/2002 | Bechtolsheim et al. |
| 6,411,896 B1 | 6/2002 | Shuman et al. |
| 6,415,222 B1 | 7/2002 | Sato et al. |
| 6,415,226 B1 | 7/2002 | Kozak |
| 6,424,904 B1 | 7/2002 | Takahashi et al. |
| 6,466,867 B1 | 10/2002 | Sakashita |
| 6,470,265 B1 | 10/2002 | Tanaka |
| 6,480,783 B1 | 11/2002 | Myr |
| 6,674,434 B1 | 1/2004 | Chojnacki et al. |
| 6,675,085 B2 | 1/2004 | Straub |
| 6,696,976 B1 | 2/2004 | Hansen |
| 6,718,262 B2 | 4/2004 | Matsuda et al. |
| 6,820,005 B2 | 11/2004 | Matsuda et al. |
| 6,850,841 B1 | 2/2005 | Casino |
| 6,856,902 B1 | 2/2005 | Mitchem |
| 6,864,784 B1 | 3/2005 | Loeb |
| 6,873,892 B2 | 3/2005 | Katz et al. |
| 6,895,332 B2 | 5/2005 | King |
| 6,931,319 B2 | 8/2005 | Adachi |
| 6,952,647 B2 | 10/2005 | Hasegawa et al. |
| 6,954,696 B2 | 10/2005 | Ihara et al. |
| 7,007,011 B1 | 2/2006 | Joshi |
| 7,043,357 B1 | 5/2006 | Stankoulov et al. |
| 7,171,306 B2 | 1/2007 | Hirose |
| 7,184,073 B2 | 2/2007 | Varadarajan et al. |
| 7,194,347 B2 | 3/2007 | Harumoto et al. |
| 7,259,746 B2 | 8/2007 | Kato et al. |
| 7,266,438 B2 | 9/2007 | Kellum et al. |
| 7,340,341 B2 | 3/2008 | Adachi |
| 7,400,963 B2 | 7/2008 | Lee et al. |
| 7,479,897 B2 | 1/2009 | Gertsch et al. |
| 7,516,041 B2 | 4/2009 | Smartt et al. |
| 7,680,749 B1 | 3/2010 | Golding et al. |
| 7,751,973 B2 | 7/2010 | Ibrahim |
| 8,204,680 B1 | 6/2012 | Dorum |
| 8,571,811 B1 | 10/2013 | Mueller |
| 8,775,073 B2 | 7/2014 | Denaro |
| 9,121,716 B2 | 9/2015 | Denaro |
| 9,182,241 B2 | 11/2015 | Denaro |
| 9,752,884 B2 | 9/2017 | Denaro |
| 2001/0001133 A1 | 5/2001 | Hotta |
| 2001/0020902 A1 | 9/2001 | Tamura |
| 2002/0069019 A1 | 6/2002 | Lin |
| 2002/0077733 A1 | 6/2002 | Bidaud |
| 2002/0128752 A1 | 9/2002 | Joshi |
| 2002/0161513 A1 | 10/2002 | Bechtolsheim et al. |
| 2002/0188400 A1 | 12/2002 | Sato et al. |
| 2002/0194016 A1 | 12/2002 | Moribe et al. |
| 2003/0005765 A1 | 1/2003 | Brudis et al. |
| 2003/0016145 A1 | 1/2003 | Bateman |
| 2003/0016146 A1 | 1/2003 | Bates et al. |
| 2003/0043059 A1 | 3/2003 | Miller, Jr. |
| 2003/0090392 A1 | 5/2003 | Schuessler |
| 2003/0130780 A1 | 7/2003 | Shiimado et al. |
| 2003/0182051 A1 | 9/2003 | Yamamoto |
| 2004/0022416 A1 | 2/2004 | Lemelson et al. |
| 2004/0039523 A1 | 2/2004 | Kainuma et al. |
| 2004/0107042 A1 | 6/2004 | Seick |
| 2004/0107047 A1 | 6/2004 | Joshi |
| 2004/0143385 A1 | 7/2004 | Smyth et al. |
| 2004/0143390 A1 | 7/2004 | King et al. |
| 2004/0143391 A1 | 7/2004 | King |
| 2004/0193347 A1 | 9/2004 | Harumoto et al. |
| 2004/0201495 A1 | 10/2004 | Lim |
| 2004/0201672 A1 | 10/2004 | Varadarajan et al. |
| 2004/0267455 A1 | 12/2004 | Hatano et al. |
| 2005/0065682 A1 | 3/2005 | Kapadia et al. |
| 2005/0149251 A1 | 7/2005 | Donath et al. |
| 2005/0192746 A1 | 9/2005 | King |
| 2005/0240334 A1 | 10/2005 | Matsumoto et al. |
| 2005/0251335 A1 | 11/2005 | Ibrahim |
| 2005/0264404 A1 | 12/2005 | Franczyk et al. |
| 2006/0041372 A1 | 2/2006 | Kubota et al. |
| 2006/0064239 A1 | 3/2006 | Ishii |
| 2006/0097859 A1 | 5/2006 | Nordbruch |
| 2006/0109095 A1 | 5/2006 | Takata et al. |
| 2006/0114125 A1 | 6/2006 | Kubota et al. |
| 2006/0149780 A1 | 7/2006 | Joshi |
| 2006/0220904 A1 | 10/2006 | Jarlengrip |
| 2006/0287817 A1 | 12/2006 | Nagel |
| 2007/0008090 A1 | 1/2007 | Gertsch et al. |
| 2007/0021910 A1 | 1/2007 | Iwami et al. |
| 2007/0040705 A1 | 2/2007 | Yoshioka et al. |
| 2007/0050127 A1 | 3/2007 | Kellum et al. |
| 2007/0050130 A1 | 3/2007 | Grimm et al. |
| 2007/0162019 A1 | 7/2007 | Burns et al. |
| 2007/0192020 A1 | 8/2007 | Brulle-Drews et al. |
| 2007/0222662 A1 | 9/2007 | Toennesen et al. |
| 2007/0288158 A1 | 12/2007 | Dorum |
| 2007/0296574 A1 | 12/2007 | Smith et al. |
| 2008/0004806 A1 | 1/2008 | Kimura et al. |
| 2008/0033621 A1 | 2/2008 | Nakamura et al. |
| 2008/0042815 A1 | 2/2008 | Breed et al. |
| 2008/0046274 A1 | 2/2008 | Geelen et al. |
| 2008/0077309 A1 | 3/2008 | Cobbold |
| 2008/0169914 A1 | 7/2008 | Albertson |
| 2008/0215238 A1 | 9/2008 | Geelen et al. |

(56) References Cited

U.S. PATENT DOCUMENTS

| | | |
|---|---|---|
| 2008/0243380 A1 | 10/2008 | Han |
| 2009/0140887 A1 | 6/2009 | Breed et al. |
| 2009/0144030 A1 | 6/2009 | Witmer |
| 2009/0295598 A1 | 12/2009 | Denaro |
| 2009/0295604 A1 | 12/2009 | Denaro |
| 2009/0296630 A1 | 12/2009 | Chen et al. |
| 2009/0299615 A1 | 12/2009 | Denaro |
| 2009/0299616 A1 | 12/2009 | Denaro |
| 2009/0299617 A1 | 12/2009 | Denaro |
| 2009/0299622 A1 | 12/2009 | Denaro |
| 2009/0299624 A1 | 12/2009 | Denaro |
| 2009/0299625 A1 | 12/2009 | Denaro |
| 2009/0299626 A1 | 12/2009 | Denaro |
| 2009/0299630 A1 | 12/2009 | Denaro |
| 2009/0300035 A1 | 12/2009 | Denaro |
| 2009/0300053 A1 | 12/2009 | Denaro |
| 2009/0300067 A1 | 12/2009 | Denaro |
| 2010/0001133 A1 | 1/2010 | Kempa et al. |
| 2010/0121886 A1 | 5/2010 | Koshiba et al. |
| 2010/0191421 A1 | 7/2010 | Nilsson |
| 2010/0332266 A1 | 12/2010 | Tamir et al. |
| 2016/0018227 A1 | 1/2016 | Denaro |

DATA MINING IN A DIGITAL MAP DATABASE TO IDENTIFY BLIND INTERSECTIONS ALONG ROADS AND ENABLING PRECAUTIONARY ACTIONS IN A VEHICLE

REFERENCE TO RELATED APPLICATIONS

This application is a continuation under 37 C.F.R. § 1.53(b) of U.S. patent application Ser. No. 15/041,672 filed Feb. 11, 2016 now U.S. Pat. No. 9,797,735, the entire disclosure of which is hereby incorporated by reference, which is a continuation under 37 C.F.R. § 1.53(b) of U.S. patent application Ser. No. 14/694,252 filed Apr. 23, 2015 now U.S. Pat. No. 9,279,688, the entire disclosure of which is hereby incorporated by reference, which is a continuation under 37 C.F.R. § 1.53(b) of U.S. patent application Ser. No. 14/182,825 filed Feb. 18, 2014 now U.S. Pat. No. 9,043,127, the entire disclosure of which is hereby incorporated by reference, which is a continuation under 37 C.F.R. § 1.53(b) of U.S. patent application Ser. No. 12/156,276 filed May 30, 2008 now U.S. Pat. No. 8,688,369, the entire disclosure of which is hereby incorporated by reference. The present patent application is related to patent application Ser. No. 12/156,264, filed on May 30, 2008, now U.S. Pat. No. 9,134,133, entitled "DATA MINING TO IDENTIFY LOCATIONS OF POTENTIALLY HAZARDOUS CONDITIONS FOR VEHICLE OPERATION AND USE THEREOF," the entire disclosure of which is incorporated by reference herein.

BACKGROUND

The present invention relates to a method and system that enables taking a precautionary action in a vehicle, such as providing a warning to a vehicle driver about a potentially difficult or hazardous driving condition on the road network.

Advanced driver assistance systems ("ADAS"), including active safety and fuel economy systems, have been developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and lidar. Some advanced driver assistance systems also use digital map data. Digital map data can be used in advanced driver assistance systems to provide information about the road network, road geometry, road conditions and other items associated with the road and terrain around the vehicle. Digital map data is not affected by environmental conditions, such as fog, rain or snow. In addition, digital map data can provide useful information that cannot reliably be provided by cameras or radar, such as curvature, grade, bank, speed limits that are not indicated by signage, traffic and lane restrictions, etc. Further, digital map data can provide a predictive capability well beyond the range of other sensors or even beyond the driver's vision to determine the road ahead of the vehicle, around corners, over hills or beyond obstructions. Accordingly, digital map data can be a useful addition for some advanced driver assistance systems.

Although these kinds of systems provide useful features, there exists room for further improvements. For example, it would be useful to identify locations on the road network where a relatively high number of traffic accidents have occurred. However, statistics pertaining to accidents are maintained by various different administrative entities that use different formats, standards, reporting methods, reporting periods, etc. Accordingly, it is difficult to obtain consistent information about traffic accidents on roads in a large geographic region, such as the entire United States or Europe. Moreover, data indicating locations where a statistically large number of traffic accidents occur may not indicate the causes of the accidents or how accidents can be avoided.

Accordingly, it is an objective to provide a system that facilitates taking a precautionary action in a vehicle, such as providing as warning to a vehicle operator, when approaching a location of a blind intersection.

SUMMARY OF THE INVENTION

To address these and other objectives, the present invention comprises a feature that enables taking a precautionary action in a vehicle as the vehicle approaches a blind intersection. The precautionary action may be a warning message provided to the vehicle driver to alert the vehicle driver about the blind intersection so that the vehicle driver can pay extra attention. Alternatively, the precautionary action may be an actual modification of the operation or control of the vehicle, such as braking, accelerating, or maneuvering the vehicle, or activating a sensor. Alternatively, the precautionary action may be providing an input to an algorithm that also processes inputs from other sensors for taking such actions. In another alternative, the precautionary action may include a combination of any of these aforementioned actions.

According to another aspect, a database that represents the road network is used to determine locations of blind intersections are located. Then, precautionary action data is added to the database to indicate a location at which a precautionary action is to be taken about the blind intersection.

According to further aspects, a precautionary action system installed in a vehicle uses this database, or a database derived therefrom, in combination with a positioning system, to determine when the vehicle is at a location that corresponds to the location where a precautionary action should be taken. When the vehicle is at such a location, the precautionary action is taken, such as providing a warning to the vehicle operator, as the vehicle is approaching a blind intersection. Alternatively, the precautionary action may consist of an actual modification of the operation or control of the vehicle, such as braking, accelerating, or maneuvering the vehicle, or activating a sensor. Alternatively, the precautionary action may include providing an input to an algorithm that also processes inputs from other sensors for taking such actions. Alternatively, the precautionary action may be adjustment of sensitivities of other ADAS applications such as increasing the control authority and sensitivity of a lane departure warning or control system to lane edge approach and violation. In another alternative, the precautionary action may include a combination of any of these aforementioned actions.

DETAILED DESCRIPTION OF THE DRAWINGS AND PRESENTLY PREFERRED EMBODIMENTS

Figure 1:
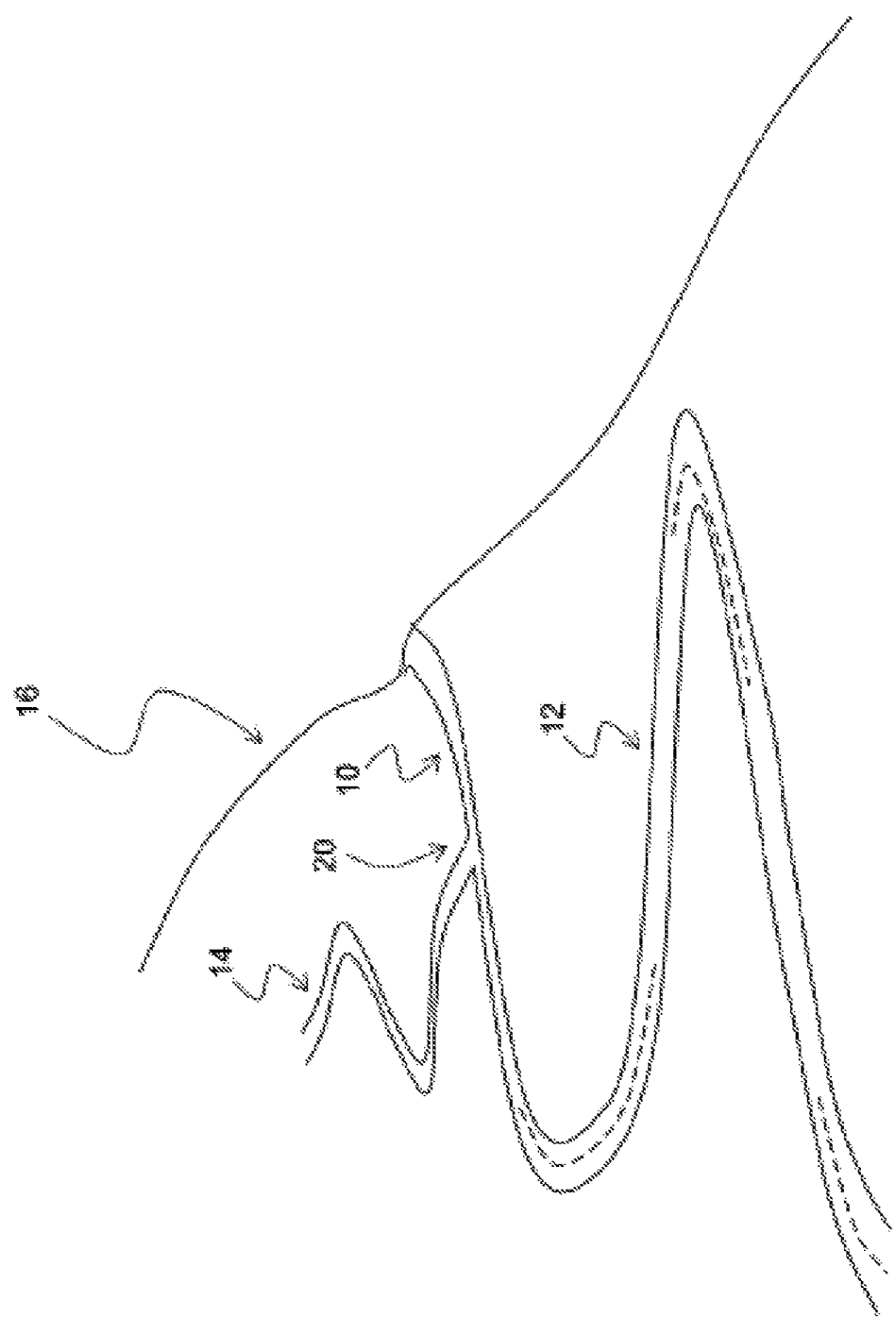
FIG. 1 is an illustration of a portion of a road network with a blind intersection.

FIG. 1 depicts road segments 10, 12 and 14. These road segments meet at an intersection 20. The road segment 12 is curved and located along a hill where it meets the intersection 20. Because of the slope of the hill or the curvature of the road or both, a vehicle driver traveling along the road segment 12 in the direction toward the intersection 20 may not have a good view of the intersection 20 or any vehicles approaching the intersection from the road segment 14. Because a driver's view of the intersection is blocked for some distance while traveling up to the intersection, the intersection is considered a "blind" intersection. Because of the blocked view, the intersection is potentially hazardous.

Figure 2:
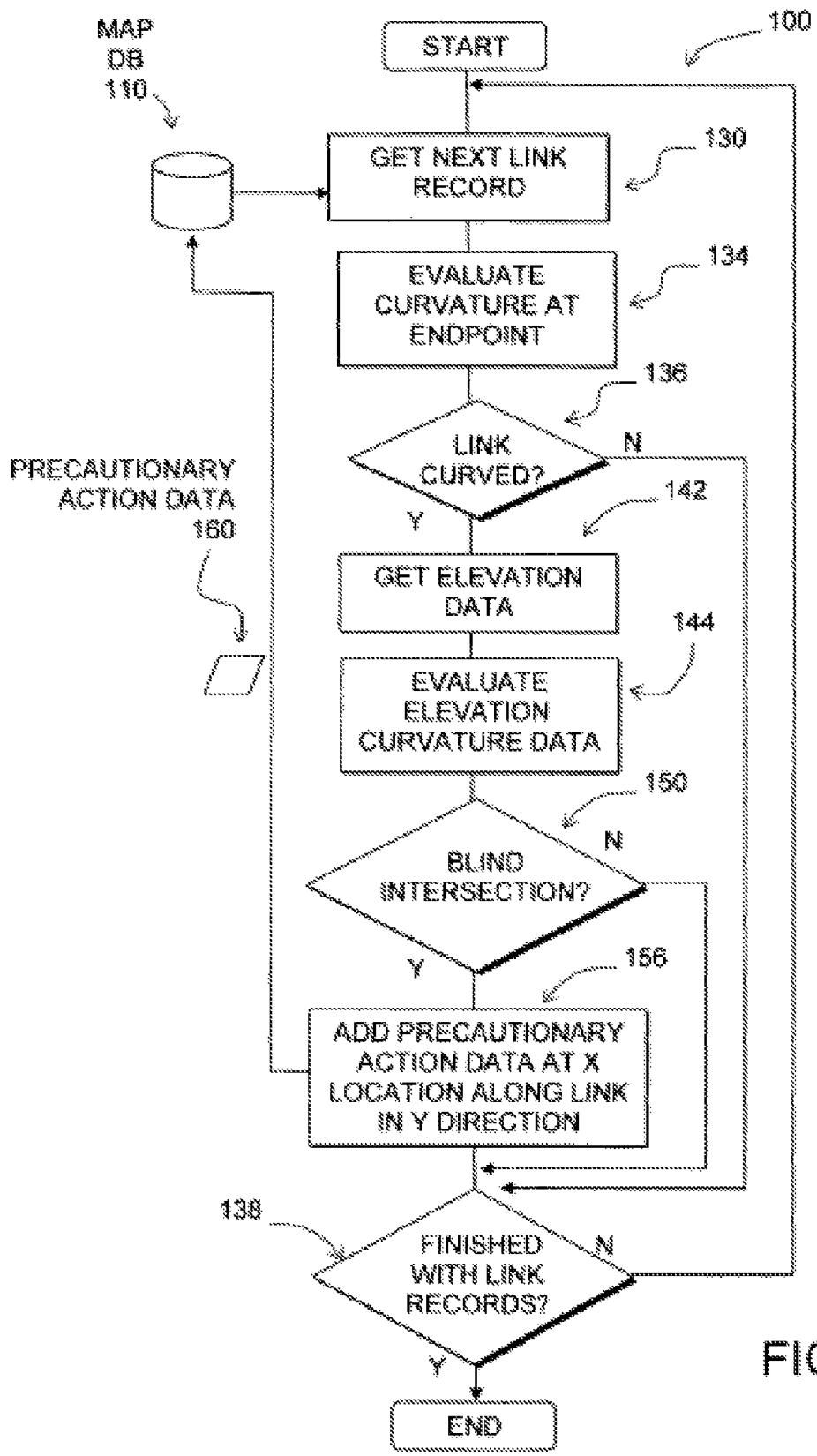
FIG. 2 is a flowchart of a process that uses a database that represents a road network to identify conditions such as the one shown in FIG. 1.

FIG. 2 is a flowchart of a process 100. The process 100 is performed by a software program or routine that is run on a suitable computing platform, such as a database server, PC or plurality of PCs coupled together for parallel computing applications.

The process 100 uses a database 110 that contains data that represents the road network in a region. The region may be a country, such as the United States, Germany, France or Korea. Alternatively, the region may include several countries or an entire continent. According to another alternative, the region may include only a portion of a country, such as a state or several states or metropolitan areas.

The process 100 is performed by a map developer, such as NAVTEQ Corporation. Alternatively, the process 100 may be performed by another entity that has access to an editable version of a map database 110. For example, the process may be performed by a customer or licensee of NAVTEQ, such as a manufacturer of navigation systems or active safety systems, or by a traffic information services company or by a government office at any level.

The database 110 is in a format that can be edited. That is, new or updated information can be added to the database 110. Alternatively, the database 110 is in a format such that new information can be combined with the original data to form a new database that includes both the original data and new data. In one embodiment, the database is in an Oracle spatial format. Alternatively, the database may be in delivery format, such as GDF (Geographic Data File), SIF (Standard Interchange Format), or other formats, including proprietary formats.

As stated above, the database 110 contains data that represents the road network in the region. The database 110 contains information such as the locations (geographic coordinates, including altitude) of roads and intersections, road names, the three-dimensional shape of the roads including curvature, slope and bank, speed limits along roads, turn restrictions at intersections, addresses or address ranges along roads, the number of lanes each road has, lane width, traffic control features such as stop signs and traffic lights, lane markings, functional classes of roads, the locations of medians, and so on. The database may also contain information about other geographic features, such as bodies of water, parks, administrative areas (including municipal, state and country boundaries), and locations of points of interest, such as businesses, hospitals, police stations, and so on.

In FIG. 2, the process 100 examines each data record that represents a road segment (also referred to herein as a "link") to determine whether it represents one similar to the road segment 12 or 14 in FIG. 1. (The process 100 may use a procedure that examines in turn each data record that represents each road segment represented in the entire database.) In one step, a data record that represents a link or road segment is read from the database 110 (Step 130). This road segment record may include data (e.g., shape points) that indicate whether the road segment is curved leading into an intersection (i.e., an endpoint of the road segment). This data is evaluated (Step 134). If the represented road segment is not curved leading into an intersection, the process 100 proceeds to a step in which it is determined whether all the road segment records in the database have been examined (Steps 136 and 138). If there are more segment records to examine, the process 100 proceeds to get the next segment record (Step 130) and continues.

Referring back to Step 136, if the represented road segment is curved, the process 100 proceeds to obtain the data that represent the segment's elevation (Step 142). The data that represent the segments' elevation is examined (Step 144). From an examination of segment's curvature leading into an intersection, as well as the data that represent the segment's elevation, it is determined whether there exists a blind intersection along the road segment (or combination of road segments, such as road segments 12 and 14 shown in FIG. 1). If examination of the segment's curvature and elevation indicates that there is no blind intersection, the process 100 proceeds to the step in which it is determined whether all the road segment records in the database have been examined (Steps 150 and 138) and if there are more segment records to examine, the process 100 proceeds to get the next segment record (Step 130).

Referring back to Step 150, if examination of the segment's curvature and elevation indicates that there is a blind intersection along the road, the process 100 adds precautionary action data 160 to the database 110 (Step 156). The precautionary action data 160 indicates the presence of a feature in the road network where a precautionary action may be taken. After the precautionary action data 160 is added to the database 110, the process 100 proceeds to the step in which it is determined whether all the road segment records in the database have been examined (Step 138) and if there are more segment records to examine, the process 100 proceeds to get the next segment record (Step 130).

The process 100 ends when it is determined that all the road segment records have been examined (Step 138).

It is noted that the process 100, above, performs a data mining function. The existence of the potentially difficult location, i.e., the presence of a blind intersection along a road, is derived from data already collected and present in the database. It is noted that the process 100, above, evaluates multiple data items in the original database, to determine whether the condition exists, in this case, a blind intersection. The blind intersection may be caused by a hill, a curve, a building, landscape, or other geographic feature represented by data in the database that obstructs a driver's view of an intersection. By evaluating these multiple data items, a determination is made whether these multiple data items describe the condition of interest. If these data items do describe the condition, a new data item, i.e., the precautionary action data, is added to the database.

It is further noted that the process 100 may use one or more thresholds when evaluating various items of data to determine whether the potentially hazardous condition exists. For example, the amount of curvature along a road segment or the height of an feature may be compared to a threshold to determine whether a driver's view might be sufficiently obstructed such that a blind intersection is considered to exist.

Figure 3:
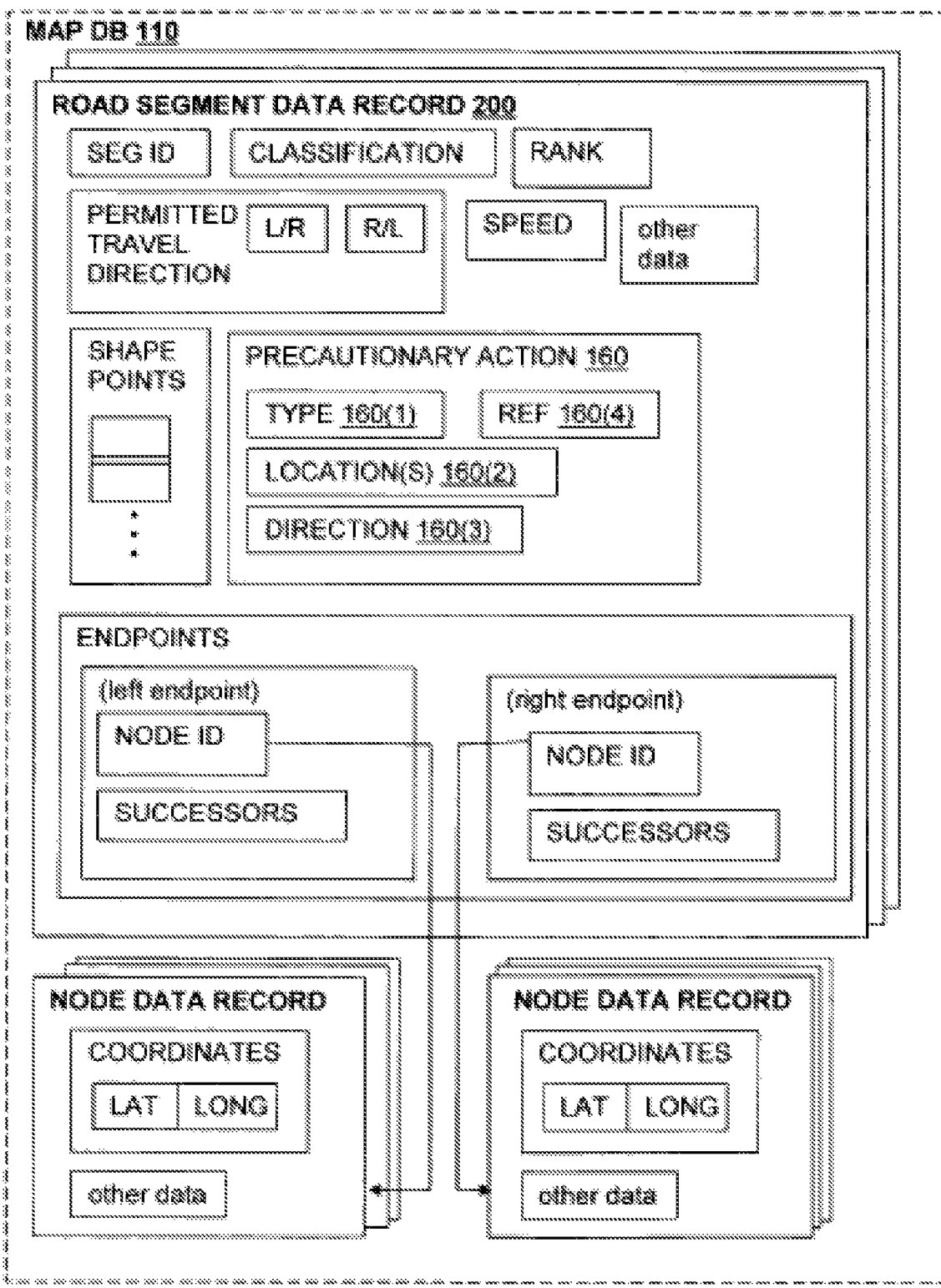
FIG. 3 is a diagram of a data record formed by the process of FIG. 2.

FIG. 3 is a diagram that shows a data record 200 in the database 110. The data record 200 represents a road segment located in a geographic region. As explained above, the geographic region may include an entire country or continent. Accordingly, the database 110 includes many data records like the one shown in FIG. 3.

The data record 200 shown in FIG. 3 is exemplary and shows only one way to represent a road segment. Databases may represent road segments in various different ways and may include different kinds of information. The present invention is not limited to any particular way of representing roads.

Referring to FIG. 3, various data are associated with the data record 200 that represents a road segment. This various data indicates features or attributes of the represented road segment. For example, associated with the data record is data that indicates the permitted direction(s) of travel. Also associated with the road segment record 200 are data that indicate a speed limit, a classification of the road segment (i.e., the type of road, such as controlled access, etc.), a rank (e.g., 1-4), the endpoints of the road segment, shape points (i.e., locations along the road segment between its endpoints). Also associated with the road segment records is data that indicate the successors at each endpoint. Successors are those road segments that connect to the represented road segment at each of its endpoints. The segment record 200 may identify these successors by reference to the data records that represent the successors.

In FIG. 3, the database 110 also includes precautionary action data 160. The precautionary action data 160 is the data added to the database 110 by the process 100 in FIG. 2. In FIG. 3, the precautionary action data 160 is shown as added to the road segment record 200. It should be understood that the process 100 adds precautionary action data 160 with respect to only certain records, i.e., records that represent those roads segments that meet the conditions identified by the process. Accordingly, the database 110 will contain data records that represent road segments that contain the precautionary action data 160 and other data records that represent road segments that do not contain the precautionary action data 160.

In the embodiment shown in FIG. 3, the precautionary action data 160 is associated with the road segment identified as having a blind intersection. In this embodiment, the precautionary action data 160 includes several components. One component 160(1) indicates a condition type. This condition type 160(1) indicates the type of condition about which a precautionary action is to be taken, which in this case is a blind intersection. This condition type 160(1) component is used when different conditions are identified in the database 110 about which precautionary action may be taken.

Another component of the precautionary action data 160 is the precautionary action location 160(2). The precautionary action location 160(2) indicates where along the represented road segment a precautionary action may be taken. The precautionary action location 160(2) data may include multiple entries. For example, the precautionary action location 160(2) may indicate where a warning may be provided to a vehicle driver to advise the driver about the upcoming condition, i.e., the blind intersection. In the case of a blind intersection, the warning location 160(2) may indicate a distance (e.g., x meters) from the blind intersection. The location 160(2) is determined based on an analysis of factors, such as the slope of the hill (if any), the speed limit along the represented road segment, the road classification, and possibly other factors. These factors may be determined from other data contained in the database 110. According to one example, the location 160(2) may indicate that a warning should be provided at a location 400 meters along the road segment from the blind intersection.

The precautionary action location 160(2) may also indicate where a vehicle control action should be taken, such as tightening the seatbelts, pre-loading or engaging the brakes, tightening sensitivities of lane departure warning systems or stability control systems, etc. This may be a different location from where the precautionary warning is provided and would be based on a different analysis of factors.

Another component of the precautionary action data 160 is direction data 160(3). The direction data 160(3) indicates the direction along the represented road segment where the precautionary action should be taken. In this case, the direction data 160(3) indicates the direction toward the blind intersection. (Note that the database 110 may indicate a direction along a road segment as positive or negative based on the relative latitude and longitude of the road segment endpoints. Accordingly, the direction may be indicated as positive or negative.)

Another component of the precautionary action data 160 is a reference 160(4). In this case, the reference 160(4) indicates the blind intersection.

The precautionary action data 160 described in FIG. 3 is one way that this data may be included in a database that represents a geographic region. There are alternative ways to include the precautionary action data. For example, the precautionary action data may be included as separate data records in the database 110. If included as separate data records, the precautionary action data may be associated with the road segments to which they apply by pointers or other suitable data references. Alternatively, the precautionary action data may be associated with node data records, i.e., the data that represent the intersections, instead of the road segments leading to the intersections. Various other ways exist and the present invention is not intended to be restricted to any specific implementation.

Figure 4:
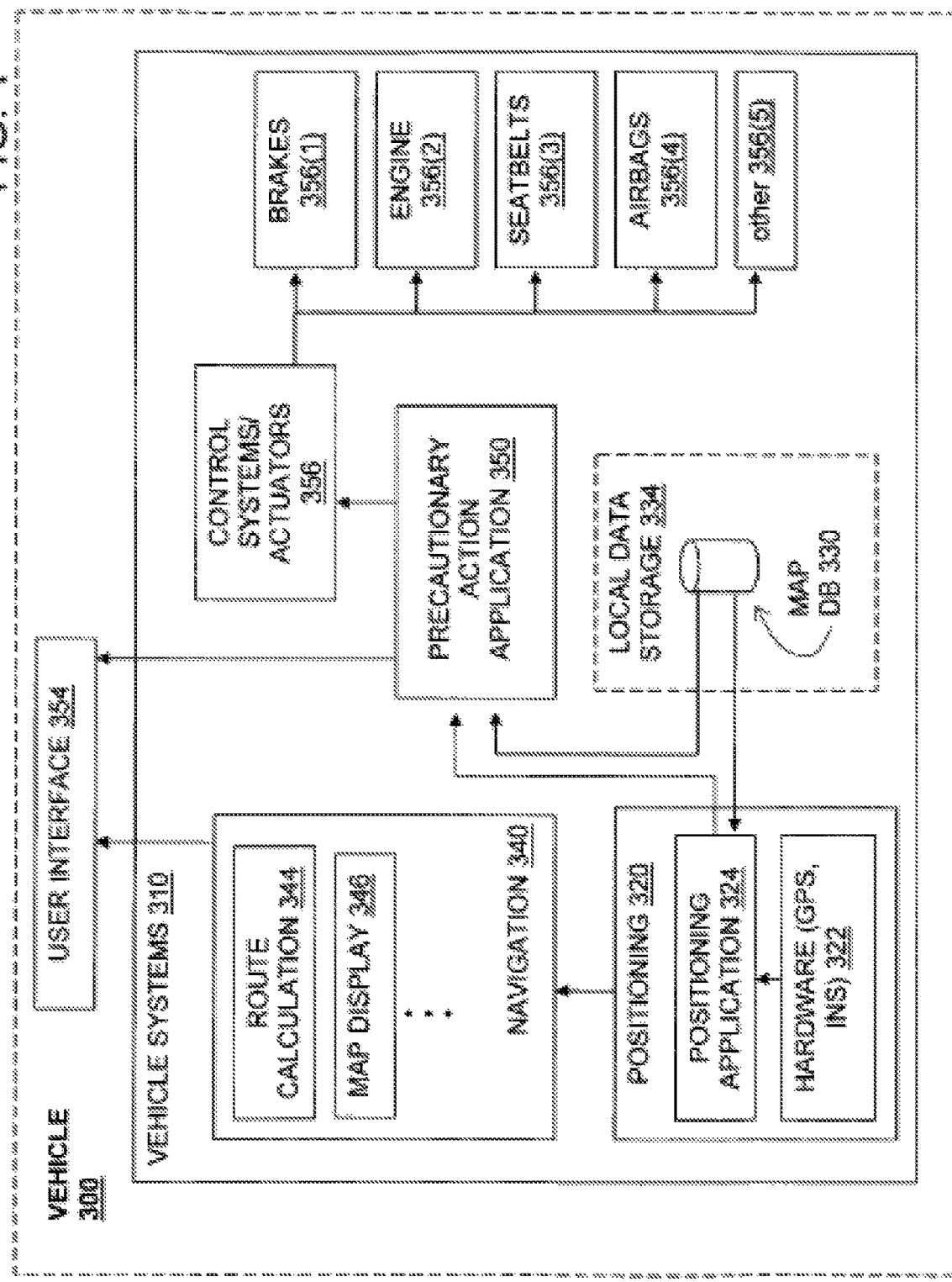
FIG. 4 is a diagram of a vehicle system that uses data produced by the process of FIG. 2.

FIG. 4 is a diagram depicting components of a vehicle 300. The vehicle 300 is operated on a road network, such as the road network represented by the database 110 in FIG. 2. The vehicle 300 may be an automobile, truck, bicycle, motorcycle, etc.

The vehicle 300 includes systems 310. In this embodiment, the vehicle systems 310 include a positioning system 320. The positioning system 320 determines the position of the vehicle 300 on the road network. The positioning system 320 includes appropriate hardware and software to determine the position of the vehicle 300. For example, the positioning system may include hardware 322 that includes a GPS unit, an accelerometer, wheel speed sensors, etc. The positioning system 320 also includes a positioning application 324. The positioning application 324 is a software application that uses outputs from the positioning system hardware 322 and information from a map database 330. The positioning application 324 determines the position of the vehicle 300 with respect to the road network, including the location of the vehicle 300 along a road segment and a direction of travel of the vehicle along the road segment.

In one embodiment, the map database 330 is located in the vehicle. In an alternative embodiment, the map database 330 may be located remotely and accessed by the vehicle systems 310 using a wireless communication system. In yet another embodiment, part of the map database 330 may be located locally in the vehicle and part of the map database 330 may be located remotely.

The map database 330 is stored on a computer readable medium 334. The computer-readable medium may be implemented using any suitable technology. For example, the computer readable medium may be a DVD disk, a CD-ROM disk, a hard disk, flash memory, or any other medium, or a plurality of media.

The map database 330 includes data that represents the geographic region in which the vehicle 300 is being operated. The map database 330 may represent the same geographic region as the database 110 in FIG. 2, or alternatively, the map database 330 may represent only a portion of the region represented by the database 110.

The map database 330 used by the vehicle systems 310 may be in a different format from the database 110 in FIG. 2. The map database 330 is formed or derived from the database 110 by a compilation process that organizes and presents the data in a form and format that specifically facilitates its use for performing specific functions. For example, the map database 330 may be separated into different collections of data that are used for specific functions, such as vehicle positioning, route calculation, map display, route guidance, destination selection, and so on. The map database 330 may also be organized into groupings spatially. One kind of compiled database format is disclosed in U.S. Pat. No. 5,968,109, the entire disclosure of which is incorporated by reference herein. Various other compiled database formats exist, including proprietary formats, and the disclosed embodiment(s) are not limited to any particular format.

Included among the vehicle systems 310 in FIG. 4 is a navigation system 340. The navigation system 340 uses outputs from the positioning system 320 and data from the map database 330 to provide navigation-related features to a vehicle user, e.g., the vehicle operator or passenger. The navigation system 340 includes applications for route calculation 344, map display 346, as well as possibly other applications. The navigation system 340 provides the navigation-related features to the vehicle user via a user interface 354. (The navigation system 340 is optional and may be omitted.)

Also included among the vehicle systems 310 is a precautionary action application 350. The precautionary action application 350 uses outputs from the positioning system 320 and data from the map database 330 to take precautionary actions, such as provide warnings to the vehicle operator. The precautionary action application 350 provides the warning to the vehicle operator via the user interface 354.

FIG. 4 also shows that precautionary action application 350 provides an output to vehicle control systems and actuator 356. The vehicle control systems and actuator are operatively connected to various vehicle mechanical systems, such as the vehicle's brakes 356(1), engine 356(2), seatbelts (including tensioners) 356(3), airbags 356(4), stability control algorithms, as well as other system systems 356(5).

Figure 5:
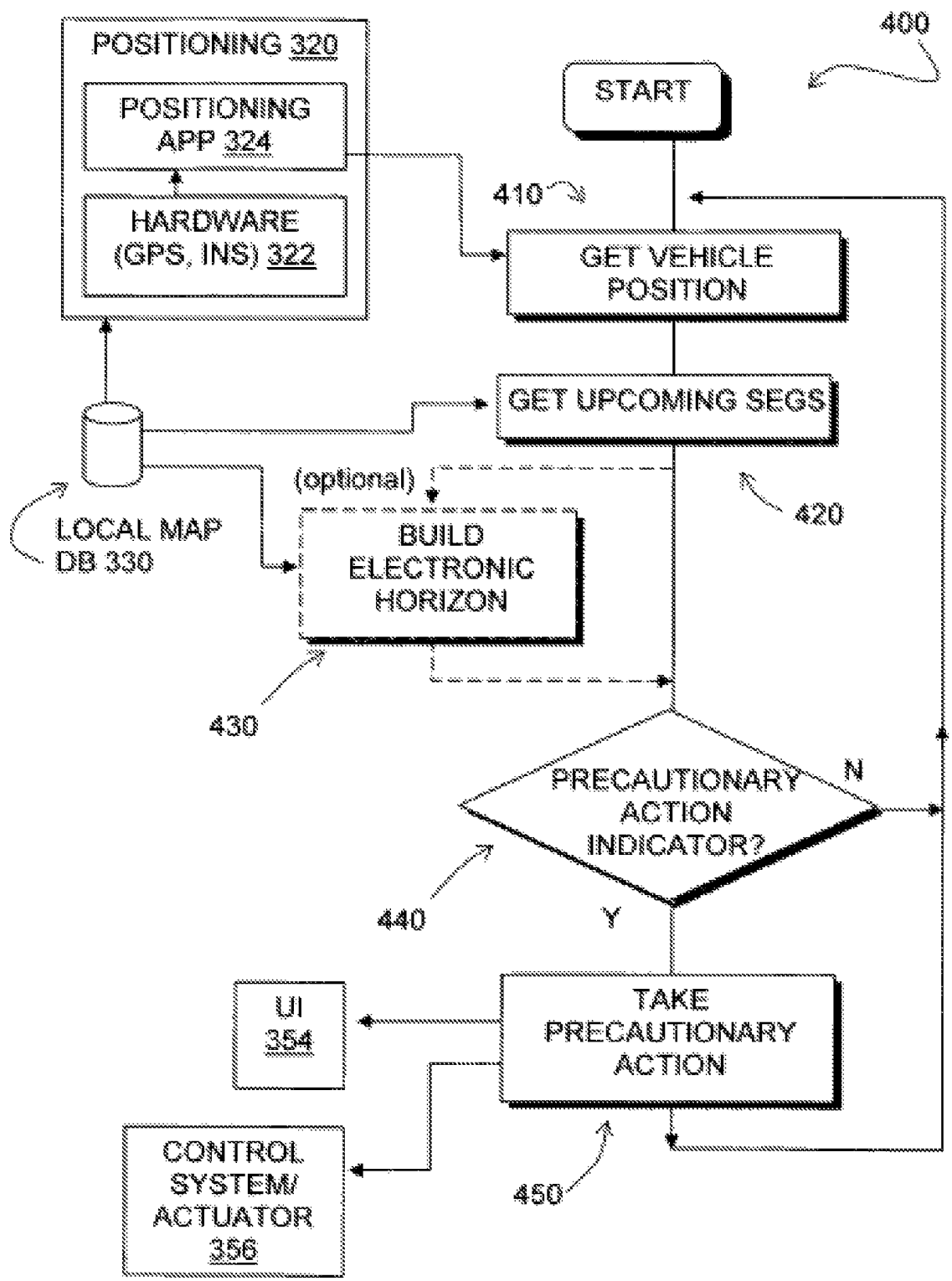
FIG. 5 is a flowchart of a process performed by the system of FIG. 4.

FIG. 5 is a flowchart 400 showing operation of the precautionary action application 350 (in FIG. 4). As the vehicle 300 (in FIG. 4) is being operated on a road, the precautionary action application 350 obtains the current vehicle position from the positioning system 320 (Step 410). (During vehicle operation, the positioning system 320 continuously determines the current geographic position of the vehicle 300 as the vehicle is being operated using data from the map database 330.) The positioning system 320 provides the precautionary action application with data that indicates the current vehicle position with respect to the road network as represented by the map database 330. Specifically, the location of the vehicle along a road segment and the direction of travel of the vehicle along the road segment are determined and provided to the precautionary action application 350.

Next, the process 400 obtains data from the map database 300 that represents the geographic features (i.e., roads, intersections, etc.) at the current location of the vehicle and in the direction in which the vehicle is heading (Step 420). In one embodiment, an electronic horizon is used (Step 430). Building an electronic horizon and using it to provide warnings are disclosed in U.S. Pat. Nos. 6,405,128 and 6,735,515 and U.S. patent application Ser. No. 11/400,151, the entire disclosures of which are incorporated by reference herein. Using an electronic horizon and/or the inventions disclosed in these patents and pending patent application is optional and the disclosed process 400 is not limited to using the electronic horizon technology.

After obtaining data from the map database 300 that represents the geographic features at the current location of the vehicle and in the direction in which the vehicle is heading, the process 400 includes the step of examining the data to determine whether any precautionary action data (160 in FIG. 3) is associated with the represented geographic features (Step 440). If there is no precautionary action data associated with the represented geographic features, the process 400 loops back to get a new current vehicle position (Step 410). On the other hand, if there is precautionary action data associated with the represented geographic features, the process 400 takes a precautionary action (Step 450). The precautionary action may be a warning provided to the vehicle operator when the vehicle is at the location (i.e., 160(2) in FIG. 3) indicated by the precautionary action data. The warning may be provided via the user interface 354. The warning may be an audible warning message or a visual warning.

The precautionary action is not limited to warnings, but may also include other actions. For example, in the case of a blind intersection, vehicle systems 356, such as the brakes, engine or transmission, can be readied for a quick deceleration or stop. In addition, the seatbelts may be tightened or the airbags set to deploy. As explained above, to facilitate these kinds of actions, additional information may be added to the warning data 160 (in FIG. 3) to indicate the type of action as well as the location where the action should be taken.

Referring still to FIG. 5, after taking the precautionary action, the process 400 loops back to get a new current vehicle position (Step 410).

Alternative with Dynamic Data

The process (400 in FIG. 5) was described as a way to use the precautionary action data that had been stored in the map database to take an appropriate action in a vehicle when the vehicle is at or is approaching a location identified as having a potentially hazardous condition. This process uses a positioning system and map database in the vehicle to determine when the vehicle is at or is approaching such a location. The process may also take into account dynamic information. Dynamic information may include current traffic and weather conditions, ambient light conditions, road conditions (e.g., ice), and so on. The vehicle may include systems to obtain such information. For example, the vehicle may have a traffic data receiver that obtains real-time traffic information, e.g., RDS-TMC messages. The process 400 may use the dynamic information in combination with the precautionary action data. For example, the process may modify the location at which a warning is provided. As an example, if weather conditions indicate that it is raining, the location at which a warning is provided to the vehicle driver about a blind intersection may be modified, i.e., adjusted to a point farther in advance of the location of the hazardous condition, in order to give the vehicle operator additional time or distance. The process may even take certain actions only under certain conditions. For example, a warning about a blind intersection may be provided only during nighttime hours. During daylight, the condition may not warrant a warning.

Verification

The process (100 in FIG. 2) was described as a way to automatically examine records in a database that represents roads to identify locations or conditions along the road network where a precautionary action might be taken. According to the described process, data is then added to indicate the location where the precautionary action should be taken. Alternatively, instead of automatically adding the precautionary action data to the database, the locations where such conditions are identified could be marked on a temporary basis. Then, a geographic analyst (or other human operator) could review some or all such temporarily marked locations. The analyst may conduct this review by physically traveling to the locations or by reviewing satellite or aerial photographs of the locations, or video taken while driving by the locations (previously or subsequently acquired either by the analyst or others including members of the public). Based on the review, the analyst then determines whether precautionary action data should be added to the database.

It is intended that the foregoing detailed description be regarded as illustrative rather than limiting and that it is understood that the following claims including all equivalents are intended to define the scope of the invention.

I claim:

1. A computer implemented method for providing precautionary actions in a vehicle, the method comprising:
   evaluating, by a computer processor prior to the vehicle's approach to a location ahead thereof, a combination of data items representing different road network features associated with the location in a database coupled therewith, at least one of which is undetected by at least one sensor provided on the vehicle, to determine whether the combination of the different road network features describes a condition of interest, the database comprising previously collected data representative of features of a road network in a geographic area; and
   upon the determination that the combination of data items describe the condition of interest, providing an output, by the computer processor, operative to maneuver of the vehicle via modification, by the computer processor, of the operation or control of the vehicle.

2. The computer implemented method of claim 1 wherein, subsequent to the determining and prior to the providing, the combination as describing the condition of interest has been validated by a human being based on an inspection.

3. The computer implemented method of claim 1 wherein the determination is further based on sufficient comments occurring about the particular location received via community input from citizens or organizations.

4. The computer implemented method of claim 1 wherein the condition of interest is selected from a group comprising: a turn with a decreasing radius of curvature, a turn where the superelevation (bank angle) is insufficient or in the wrong direction, a downhill segment that has an intersection at the bottom of the hill, a downhill segment that has a stop sign or stoplight at the bottom of the hill, a sharp curve on a downhill slope, a curve that has a stop sign or stoplight somewhere along the curve, a blind intersection either because it is in a turn or over a hill, an unusually narrow lane or road, a lane merge, a road entrance with no stop sign or stoplight that has no merge lane, and a curve with a lower speed recommendation than the preceding straight segment speed limit.

5. The computer implemented method of claim 1 wherein the at least one different road network feature is undetected by the at least one sensor because it lies beyond the range thereof.

6. The computer implemented method of claim 1 wherein the at least one different road network feature is undetected by the at least one sensor because it is obscured by inclement weather.

7. The computer implemented method of claim 1 wherein the providing further comprises evaluating, by the computer processor, another condition, wherein the providing further comprises upon the determination that the combination describes the condition of interest, and the other condition is satisfied, providing the output, by the computer processor, for the maneuvering of the vehicle.

8. The computer implemented method of claim 7 wherein the other condition comprises at least one of the different road network features represented by the multiple data items deviating from a threshold value.

9. The computer implemented method of claim 7 wherein the other condition comprises occurrence of a dynamic condition at a location of the vehicle at least at the time of the providing.

10. The computer implemented method of claim 9 wherein the dynamic conditions include current traffic conditions, current weather conditions, current ambient light conditions, current road conditions, or combinations thereof.

11. The computer implemented method of claim 1 wherein the different road network features represented by the combination are in physical proximity to the location.

12. The computer implemented method of claim 1 wherein the maneuvering of the vehicle occurs prior to arrival at the location.

13. The computer implemented method of claim 1 wherein the evaluating further comprises adding, by the computer processor, precautionary action data to the database when it is determined that the combination describes the condition of interest.

14. The computer implemented method of claim 1 wherein the evaluating further comprises determining, by the computer processor, precautionary action data that indicates where a precautionary action may be taken when it is determined that the combination describes the condition of interest.

15. The computer implemented method of claim 1 wherein the evaluating further comprises determining, by the computer processor, precautionary action data that indicates a direction of travel in which to take a precautionary action when it is determined that the combination describes the condition of interest and the it is further determined that the vehicle is approaching the location in the determined direction of travel.

16. The computer implemented method of claim 1 wherein the evaluating further comprises determining, by the computer processor, precautionary action data that indicates a type of condition about which a precautionary action is to be taken when it is determined that the combination describes the condition of interest.

17. A computer implemented method for providing precautionary actions in a vehicle comprising:
evaluating, by a computer processor, multiple data items associated with a location and already collected and present in a database that contains data items that represents features of a road network in a geographic area, at least one of which is undetectable by at least one sensor provided on the vehicle;
determining, by the computer processor, whether, when a combination of the features represented by the multiple data items describe a condition of interest; and
upon determining that the combination describes a condition of interest, providing an output, by the computer processor, for maneuvering the vehicle when approaching the location by modifying operation or control of the vehicle.

18. The computer implemented method of claim 17 wherein the database is located in the vehicle.

19. The computer implemented method of claim 17 wherein the database is located remotely and accessed by vehicle systems in the vehicle.

20. The computer implemented method of claim 17 wherein part of the database is located locally in the vehicle and part of the database is located remotely.

21. The computer implemented method of claim 17 wherein the at least one road network feature is undetectable by the at least one sensor because it lies beyond the range thereof or is obscured therefrom.

22. A vehicle system comprising:
a sensor operative to sense one or more road network features ahead of the vehicle;
a positioning system that determines a current location of the vehicle; and
a precautionary action application responsive to the positioning system and operative to provide an output for maneuvering the vehicle to modify the operation thereof when the positioning system determines that the current location of the vehicle is approaching a location of features, represented by a combination of multiple data items determined to describe a condition of interest based on an evaluation of the subset of multiple data items stored in a database of previously collected data that represents features of a road network in a geographic area, at least one of which is undetectable by the sensor.

23. The system of claim 22 wherein the precautionary action application is further operative to indicate a location along a road segment at which the maneuvering of the vehicle is to be undertaken by a vehicle system.

24. The system of claim 22 wherein the precautionary action application is further operative to indicate a direction along a road segment at which the maneuvering of the vehicle is to be undertaken.

25. The system of claim 22 wherein the features comprise an intersection along the road and another geographic feature where, in combination, the driver's view of the intersection is obstructed by the other geographic feature.

26. The system of claim 22 wherein the precautionary action application is further operative to provide the output for maneuvering the vehicle based on precautionary action data stored in the database in association with the location of the features.

27. The system of claim 26 wherein the precautionary action data indicates a type of condition about which maneuvering the vehicle is to be undertaken.

28. The system of claim 22 wherein the road network features represented by the combinations of multiple data items associated with the location lie beyond the range of, or are obscured from, the sensor.

29. The system of claim 22 wherein the precautionary action application is further operative to evaluate another condition, wherein the precautionary action application is further operative to provide the output, upon the determination that combination describes the condition of interest, and the other condition is satisfied, for the maneuvering of the vehicle.

30. The system of claim 29 wherein the other condition comprises at least one of the road network features represented by the subset of multiple data items deviating from a threshold value.

31. The system of claim 29 wherein the other condition comprises occurrence of a dynamic condition at a location of the vehicle at least at the time of the providing.

32. The computer implemented method of claim 31 wherein the dynamic conditions include current traffic conditions, current weather conditions, current ambient light conditions, current road conditions, or combinations thereof.

33. The system of claim 22 wherein the maneuvering of the vehicle occurs at the location.

34. The system of claim 22 wherein the maneuvering of the vehicle occurs prior to arrival at the location.

35. A computer implemented method for providing precautionary actions in a vehicle comprising:
sensing, by at least one sensor located on the vehicle, one or more road network features ahead of the vehicle;
determining by a computer processor, a current position of the vehicle;
providing an output, by the computer processor, for maneuvering the vehicle to modify the operation thereof when the positioning system determines that the current location of the vehicle is approaching a location of features, represented by multiple data items, a combination of which describes a condition of interest based on an evaluation of the multiple data items stored in a database of previously collected data that represents features of a road network in a geographic area, at least one of which is undetectable by the sensor when the vehicle is approaching the location.

36. The computer implemented method of claim 35 further comprising:
building by the computer processor, an electronic horizon after accessing the database; and
using by the computer processor, the electronic horizon to determine whether the maneuvering of the vehicle should be undertaken.

37. The computer implemented method of claim 35 wherein the maneuvering of the vehicle is provided via a user interface of the vehicle.

38. The computer implemented method of claim 35 wherein the precautionary action application is further operative to indicate a location along a road segment at which the maneuvering of the vehicle is to be undertaken by a vehicle system.

39. The computer implemented method of claim 35 further comprising indicating, by the computer processor, a direction along a road segment at which the maneuvering of the vehicle is to be undertaken.

40. The computer implemented method of claim 35 wherein the features comprise an intersection along the road and another geographic feature where, in combination, the driver's view of the intersection is obstructed by the other geographic feature.

41. The computer implemented method of claim 35 further comprising providing the output, by the computer processor, for maneuvering of the vehicle based on precautionary action data stored in the database in association with the location of the features.

42. The computer implemented method of claim 41 wherein the precautionary action data indicates a type of condition about which maneuvering of the vehicle is to be undertaken.

43. The computer implemented method of claim 35 wherein the at least one road network feature lies beyond the range of, or is obscured from, the at least one sensor.

44. The computer implemented method of claim 35 wherein the providing further comprises evaluating, by the computer processor, another condition, wherein the providing further comprises upon the determination that the combination describes the condition of interest, and the other condition is satisfied, providing the output, by the computer processor, for the maneuvering of the vehicle.

45. The computer implemented method of claim 44 wherein the other condition comprises at least one of the road network features represented by the multiple data items deviating from a threshold value.

46. The computer implemented method of claim 44 wherein the other condition comprises occurrence of a dynamic condition at a location of the vehicle at least at the time of the providing.

47. The computer implemented method of claim 35 wherein the maneuvering of the vehicle occurs at the location.

48. The computer implemented method of claim 35 wherein the maneuvering of the vehicle occurs prior to arrival at the location.

* * * * *